(12) United States Patent
Nishio (10) Patent No.: US 11,524,525 B2
(45) Date of Patent: Dec. 13, 2022

(54) PNEUMATIC TIRE

(71) Applicant: The Yokohama Rubber Co., LTD., Tokyo (JP)

(72) Inventor: Koji Nishio, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/755,572

(22) PCT Filed: Oct. 23, 2020

(86) PCT No.: PCT/JP2020/039888
§ 371 (c)(1),
(2) Date: May 2, 2022

(87) PCT Pub. No.: WO2021/090710
PCT Pub. Date: May 14, 2021

(65) Prior Publication Data
US 2022/0348039 A1  Nov. 3, 2022

(30) Foreign Application Priority Data
Nov. 5, 2019 (JP) .............................. JP2019-200977

(51) Int. Cl.
*B60C 9/02* (2006.01)
*B60C 15/04* (2006.01)

(52) U.S. Cl.
CPC ...... *B60C 9/0292* (2013.01); *B60C 2015/048* (2013.01)

(58) Field of Classification Search
CPC .................................................. B60C 9/0292
See application file for complete search history.

(56) References Cited

U.S. PATENT DOCUMENTS

2016/0288585 A1*  10/2016  Okazaki .............. B60C 15/0027
2016/0325588 A1*  11/2016  Okazaki .................... B60C 3/04
2019/0359000 A1*  11/2019  Ishikawa .................. B60C 9/18

FOREIGN PATENT DOCUMENTS

JP        2-204104 A    8/1990
JP        8-48116 A     2/1996
(Continued)

OTHER PUBLICATIONS

Machine Translation: JP-2013010433-A, Asano K, (Year: 2022).*
Machine Translation: JP-08142602-A, Asano K, (Year: 2022).*
Machine Translation: JP-2017121908-A, Yamamoto T, (Year: 2022).*

Primary Examiner — Kendra Ly
(74) Attorney, Agent, or Firm — Thorpe North & Western (57) ABSTRACT

Provided is a pneumatic tire. A carcass line when 10% of a regular internal pressure is applied is composed of a curved line (S) connecting arcs having different radii of curvature and curved to project outward in a tire width direction and a curved line (T) curved to project inward in the tire width direction. A radius of curvature ($R_i$) at a point on the curved line (S) and a radius of curvature ($R_{i+1}$) at an adjacent point satisfy $|R_{i+1}-R_i|/|(R_{i+1}+R_i)/2|\leq 0.25$. An inclination ($\theta_S$) and an inclination ($\theta_T$) at a connection point (Q) of the curved line (S) and the curved line (T) satisfy $|\theta_S-\theta_T|\leq 8°$. A ratio (Hβ/Hα) between a radial height (Hα) at a maximum outer diameter position of a carcass layer and a radial height (Hβ) at a tire maximum width position satisfies Hβ/Hα ≥0.58.

8 Claims, 4 Drawing Sheets

(56) References Cited

FOREIGN PATENT DOCUMENTS

| JP | 8-142602 A | | 6/1996 | | |
|---|---|---|---|---|---|
| JP | 08142602 A | * | 6/1996 | ........... | B60C 13/003 |
| JP | 2614461 B2 | | 5/1997 | | |
| JP | 2001-1716 A | | 1/2001 | | |
| JP | 2013-10433 A | | 1/2013 | | |
| JP | 2013010433 A | * | 1/2013 | | |
| JP | 2015-66953 A | | 4/2015 | | |
| JP | 2016-2961 A | | 1/2016 | | |
| JP | 2017121908 A | * | 7/2017 | | |

* cited by examiner

PNEUMATIC TIRE

TECHNICAL FIELD

The present technology relates to a pneumatic tire mainly suitable as a tire for trucks and buses, and particularly to a pneumatic tire that can suppress deformation of the tire due to a change in internal pressure, suppress localized deformation in the vicinity of a bead portion, and reduce rolling resistance.

BACKGROUND ART

It is considered preferable that the carcass line shape of pneumatic tires (particularly tires for trucks and buses) when the tire is mounted on a rim and inflated to 10% of the regular internal pressure mainly approximates to a shape obtained from the tire equilibrium shape theory (equilibrium carcass line, see, for example, Japan Patent No. 2614461). The equilibrium carcass line is the natural equilibrium shape of a carcass layer when the tire is filled with regular internal pressure and the tension of the carcass layer receives substantially no force other than the internal pressure and the counter force generated in the region where the carcass layer overlaps a belt layer, the natural equilibrium shape being formed in balance with these forces. If the shape when the tire is inflated to 10% of the regular internal pressure approximates to the equilibrium carcass line, since the occurrence of unnecessary deformation of the tire due to the change in the internal pressure can be suppressed, it is expected to be effective in reducing the rolling resistance.

However, since tire components such as bead fillers are disposed in the vicinity of the bead portion, there is a problem that it is difficult to maintain the above-mentioned equilibrium carcass line. If the carcass line shape deviates from the equilibrium carcass line, the deformation of the tire due to the change in internal pressure cannot be suppressed, and for example, localized deformation in the vicinity of the bead portion (particularly, the portion where the carcass line shape deviates from the equilibrium carcass line) may increase and rolling resistance may worsen.

SUMMARY

The present technology provides a pneumatic tire capable of suppressing deformation of a tire due to a change in internal pressure, suppressing localized deformation in the vicinity of a bead portion, and reducing rolling resistance.

A pneumatic tire of the present technology includes: a tread portion extending in a tire circumferential direction and having an annular shape; a pair of sidewall portions respectively disposed on both sides of the tread portion; a pair of bead portions each disposed on an inner side in a tire radial direction of the pair of sidewall portions; at least one carcass layer mounted between the pair of bead portions; and a plurality of belt layers disposed on an outer circumferential side of the at least one carcass layer in the tread portion, in a tire meridian cross-section, a carcass line formed by the at least one carcass layer in a region excluding the tread portion when 10% of a regular internal pressure is applied, the carcass line being composed of a curved line S located on the tread portion side and a curved line T located on a bead portion side, the curved line S being formed by connecting a plurality of arcs having different radii of curvature and curved so as to project toward an outer side in a tire width direction as a whole, and the curved line T being curved so as to project toward an inner side in the tire width direction, a radius of curvature $R_i$ of the curved line S at an arbitrary point $P_i$ on the curved line S and a radius of curvature $R_{i+1}$ of the curved line S at an adjacent point $P_{i+1}$ separated by 5 mm from the point $P_i$ toward the bead portion side along the carcass line satisfying a relationship of $|R_{i+1}-R_i|/|(R_{i+1}+R_i)/2|\leq 0.25$, at a point Q where the curved line S and the curved line T are connected, an absolute value $|\theta_S-\theta_T|$ of a difference between an inclination $\theta_S$ of a line segment connecting the point Q and an adjacent point $P_S$ separated by 5 mm from the point Q toward the tread portion side along the curved line S and an inclination $\theta_T$ of a line segment connecting the point Q and an adjacent point $P_T$ separated by 5 mm from the point Q toward the bead portion side along the curved line T satisfying a relationship of $|\theta_S-\theta_T|\leq 8°$, and a ratio $H\beta/H\alpha$ of a radial height $H\alpha$ from an inner end in the tire radial direction of the curved line T to a maximum outer diameter position of the at least one carcass layer and a radial height $H\beta$ from the inner end in the tire radial direction of the curved line T to a tire maximum width position satisfying a relationship of $H\beta/H\alpha \geq 0.58$.

In the present technology, since the pneumatic tire has the above-mentioned structure, most of the carcass line can be substantially formed into a shape obtained from the tire equilibrium shape theory (equilibrium carcass line). Therefore, deformation can be suppressed even if there is a change in internal pressure, and it is possible to suppress localized deformation in the vicinity of the bead portion to reduce rolling resistance. Specifically, by satisfying the above-mentioned relationship of $|R_{i+1}-R_i|/|(R_{i+1}+R_i)/2|\leq 0.25$, the difference in the radius of curvature between the arc forming the carcass line (the curved line S) at the position of the point $P_i$ and the arc forming the carcass line (the curved line S) at the position of the adjacent point $P_{i+1}$ is very small, and the curved line S becomes a smooth curved line approximating to the equilibrium carcass line as a whole. Further, by satisfying the above-mentioned relationship of $H\beta/H\alpha \geq 0.58$, the tire maximum width position tends to be close to the outer side in the tire radial direction, and becomes easy to be smoothly connected to the curved line T curved so as to project toward the inner side in the tire width direction, and it becomes easy to achieve an equilibrium carcass line. In this way, since the thickness of the buttress portion can be suppressed, it is also possible to obtain the effect of reducing rolling resistance. Further, by satisfying the above-mentioned relationship of $|\theta_S-\theta_T|\leq 8°$, the curved line S curved so as to project toward the outer side in the tire width direction and the curved line T curved so as to project toward the inner side in the tire width direction are smoothly connected. The overall shape of the carcass line formed by the curved shape and the connecting shape of each portion approximates to the equilibrium carcass line in the portion that does not contact the belt layer, the bead filler, or the bead core (the curved line S), and is smoothly connected to the curved line T curved so as to project toward the inner side in the tire width direction. Therefore, deformation can be suppressed even if there is a change in internal pressure, and rolling resistance can be reduced.

In the present technology, preferably, when an intersection point of the carcass line and a normal line of the carcass line passing through a belt end portion is a point A and a point on the carcass line at the tire maximum width position is a point β, a length L of a line segment connecting the point A and the point β and a length K along the carcass line from the point A to the point D satisfy a relationship of $(K/L)^3 < 1.25$. With such a structure, the ground contact length in the vicinity of the main groove can be suppressed, the eccentricity of the peak position of the ground contact pressure distribution due to the viscoelastic characteristics can be suppressed, and the rolling resistance can be further reduced.

In the present technology, preferably, a ratio $R_Q/R_A$ of a radius of curvature $R_Q$ of the curved line S at a point Q where the curved line S and the curved line T are connected and a radius of curvature $R_A$ of the curved line S at an intersection point A of the carcass line and a normal line of the carcass line passing through a belt end portion satisfies a relationship of $R_Q/R_A \geq 2.3$. By setting such a relationship, the radius of curvature $R_Q$ of the curved line S at the point Q becomes sufficiently larger than the radius of curvature $R_A$ of the curved line S at the intersection point A, and the shape of the carcass line (curved line S) is improved, which is advantageous in suppressing localized deformation in the vicinity of the bead portion and reducing rolling resistance.

In the present technology, preferably, a periphery length U of the curved line T satisfies a relationship of U≤30 mm. In this way, it is possible to reduce the portion of the carcass line formed by the curved line T curved so as to project toward the inner side in the tire width direction, so that it is advantageous in suppressing localized deformation in the vicinity of the bead portion to reduce rolling resistance.

In the present technology, preferably, a bead portion is provided with a bead core having a hexagonal meridional cross-sectional shape, and when a vertex on a radially innermost side among six vertices of the bead core is defined as a first vertex, remaining vertices are defined as second to sixth vertices counterclockwise from the first vertex, the number of circumferential portions of a bead wire included in a side formed by the first vertex and the second vertex is $N_{12}$, the number of circumferential portions of the bead wire included in a side formed by the second vertex and the third vertex is $N_{23}$, the number of circumferential portions of the bead wire included in a side formed by the third vertex and the fourth vertex is $N_{34}$, the number of circumferential portions of the bead wire included in a side formed by the fourth vertex and the fifth vertex is $N_{45}$, the number of circumferential portions of the bead wire included in a side formed by the fifth vertex and the sixth vertex is $N_{56}$, and the number of circumferential portions of the bead wire included in a side formed by the sixth vertex and the first vertex is $N_{61}$, these numbers satisfy a relationship of $4 \leq (N_{12}-N_{45})+(N_{34}-N_{61})+(N_{56}-N_{23}) \leq 10$. In this way, it is possible to suppress the floating deformation of the bead or the like due to the shape of the bead core and suppress the localized deformation in the vicinity of the bead portion to suppress the heat generation in the bead portion, which is advantageous in reducing the rolling resistance.

In the present technology, "regular rim" is a rim defined by a standard for each tire according to a system of standards that includes standards with which tires comply, and refers to, for example, a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). In the system of standards, including standards with which tires comply, "regular internal pressure" is air pressure defined by each of the standards for each tire and refers to "maximum air pressure" in the case of JATMA, the maximum value being listed in the table "TIRE LOAD LIMITS AT VARIOUS COLD INFLATION PRESSURES" in the case of TRA, or "INFLATION PRESSURE" in the case of ETRTO. However, "regular internal pressure" is 180 kPa in a case where a tire is for a passenger vehicle. "Regular load" is a load defined by a standard for each tire according to a system of standards that includes standards with which tires comply, and refers to a "maximum load capacity" in the case of JATMA, the maximum value being listed in the table of "TIRE LOAD LIMITS AT VARIOUS COLD INFLATION PRESSURES" in the case of TRA, or "LOAD CAPACITY" in the case of ETRTO. "Regular load" corresponds to 88% of the loads described above in a case where a tire is for a passenger vehicle.

DETAILED DESCRIPTION

Configurations of embodiments of the present technology will be described in detail below with reference to the accompanying drawings.

Figure 1:
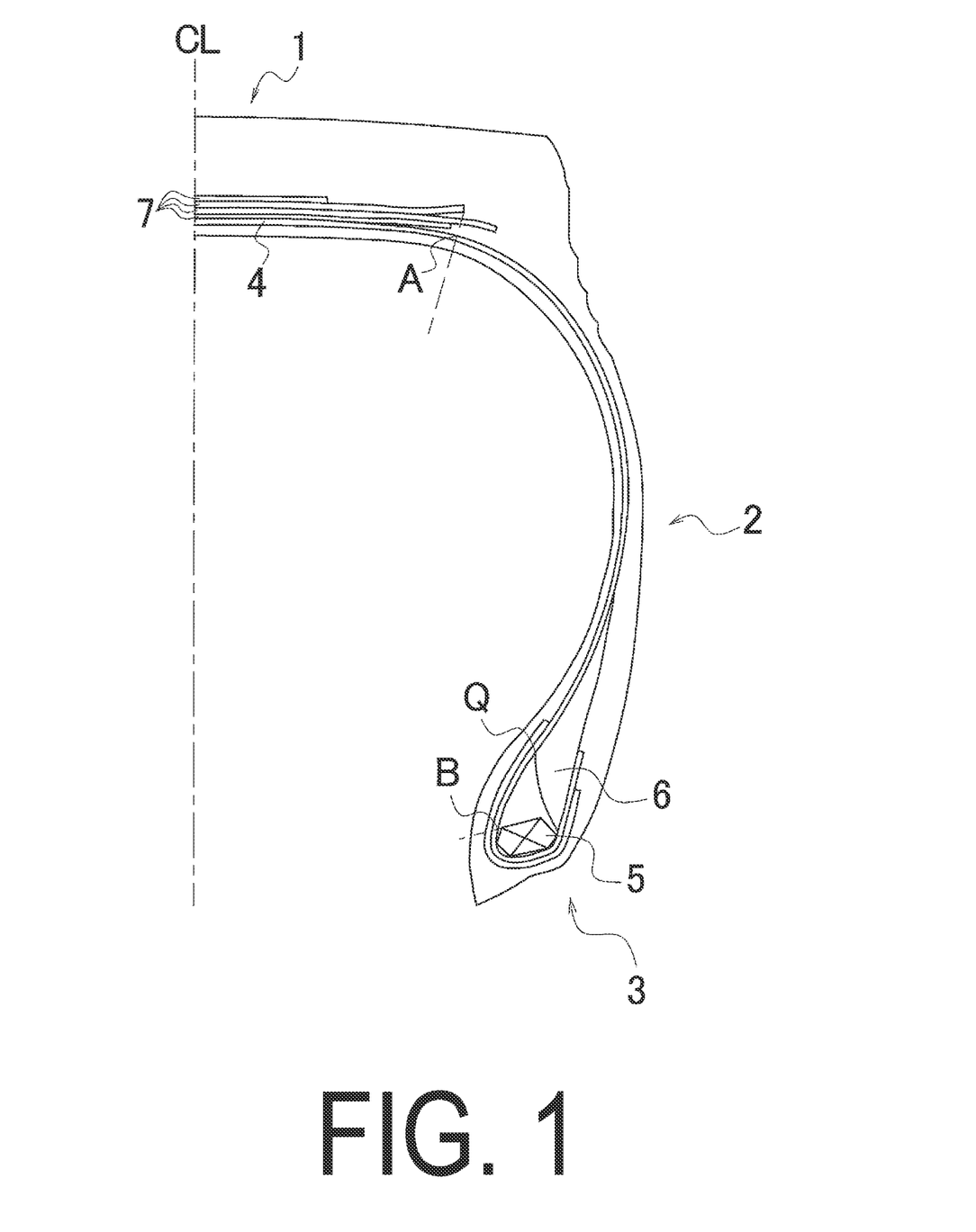
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. Note that "CL" in FIG. 1 denotes a tire equator. Note that FIG. 1 is a meridian cross-sectional view, and although not illustrated, the tread portion 1, the sidewall portions 2, and the bead portions 3 each extend in the tire circumferential direction and each have an annular shape, and accordingly, a basic structure of a toroidal shape of the pneumatic tire is formed. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, a bead filler 6 is disposed on the periphery of the bead core 5, and the bead filler 6 is enveloped by a body portion and a folded back portion of the carcass layer 4.

Figure 2:
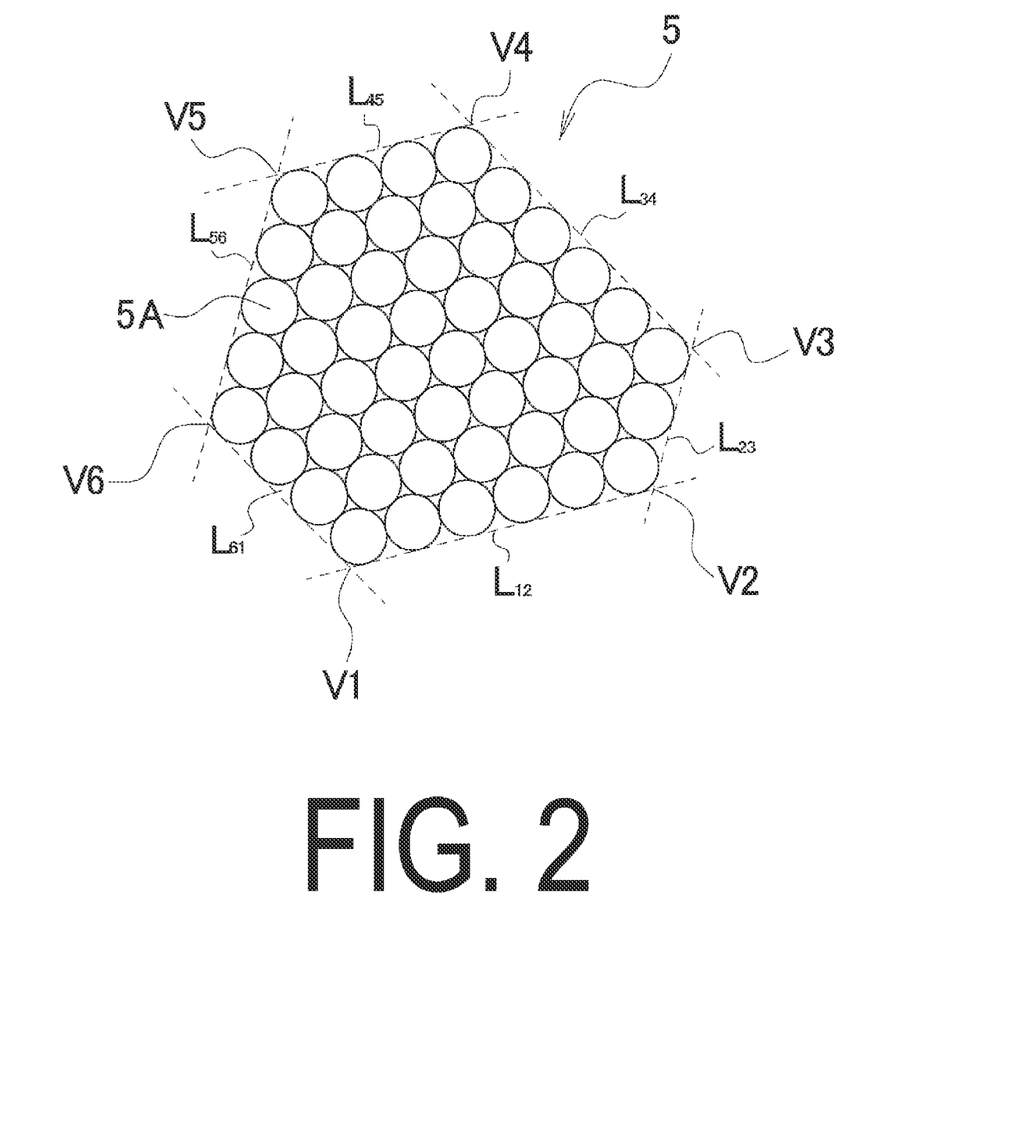
FIG. 2 is an enlarged meridian cross-sectional view illustrating a bead core of a pneumatic tire according to an embodiment of the present technology.

The cross-sectional shape of the bead core 5 is not particularly limited, but as illustrated in FIGS. 1 and 2, may be a polygonal shape (for example, a hexagonal shape as illustrated in the drawing) having sides on the outer side in the tire radial direction. More specifically, as illustrated in an enlarged view in FIG. 2, the bead core 5 may be composed of at least one bead wire 5A wound in the tire circumferential direction, and may form a plurality of layers in which a plurality of circumferential portions of the bead wire 5A overlap at least one row aligned in the tire width direction. Then, in the meridian cross-section, the common tangent lines (broken lines in the drawing) of the plurality of circumferential portions of the bead wire 5A may form a polygonal shape (for example, a hexagonal shape as illustrated in the drawing) having sides on the outer side in the tire radial direction. If it has such a shape, even if the structure of the bead core 5 may be a so-called single-winding structure in which a single bead wire 5A is continuously wound, and may be a so-called layer-winding structure in which a plurality of bead wires 5A are wound in a bunched state.

A plurality of belt layers 7 (four layers in FIG. 1) are embedded on an outer circumferential side of the carcass layer 4 in the tread portion 1. Each belt layer 7 includes a plurality of reinforcing cords (steel cords) oriented in a predetermined direction. A cross belt pair is always included in the plurality of belt layers 7. The cross belt pair is a combination of at least two belt layers configured such that the inclination angle of the reinforcing cords with respect to the tire circumferential direction is set in the range of 10° to 40°, and the inclination directions of the reinforcing cords are reversed between the layers so that the reinforcing cords intersect with each other. In addition to the cross belt pair, a large-angle belt layer in which the inclination angle of the reinforcing cord with respect to the tire circumferential direction is set in the range of 40° to 70°, a protective belt layer disposed in the outermost layer and having a width of 85% or less of that of the other belt layers, and a circumferential reinforcing layer in which the inclination angle of the reinforcing cord with respect to the tire circumferential direction is set in the range of 0° to 5° may be optionally provided. For example, in FIG. 1, one protective belt layer is disposed on the outermost layer, one large-angle belt layer is disposed on the innermost layer, and the other two layers are the cross belt pair. In the following description, the "belt end portion" refers to an end portion of the belt layer 7 on the outer side in the tire width direction having the smallest width among the cross belt pair. In addition, a belt reinforcing layer (not illustrated) can be provided on the outer circumferential side of the belt layers 7. The belt reinforcing layer may be configured of, for example, an organic fiber cord oriented in the tire circumferential direction. In the belt reinforcing layer 8, the inclination angle of the organic fiber cords with respect to the tire circumferential direction is set, for example, to from 0° to 5°.

Since the present technology relates to the shape of the carcass line formed by the carcass layer 4, it can be applied to a typical pneumatic tire including the above-mentioned constituent members, and its basic structure is not limited to those described above. In the present technology, the carcass line is a contour line formed by the outer surface (the surface on the tire outer circumferential side) of the carcass layer 4 in the tire meridian cross-section. When a plurality of carcass layers 4 are provided, the contour line formed by the outer surface of the carcass layer on the innermost layer side is defined as the carcass line.

Figure 3:
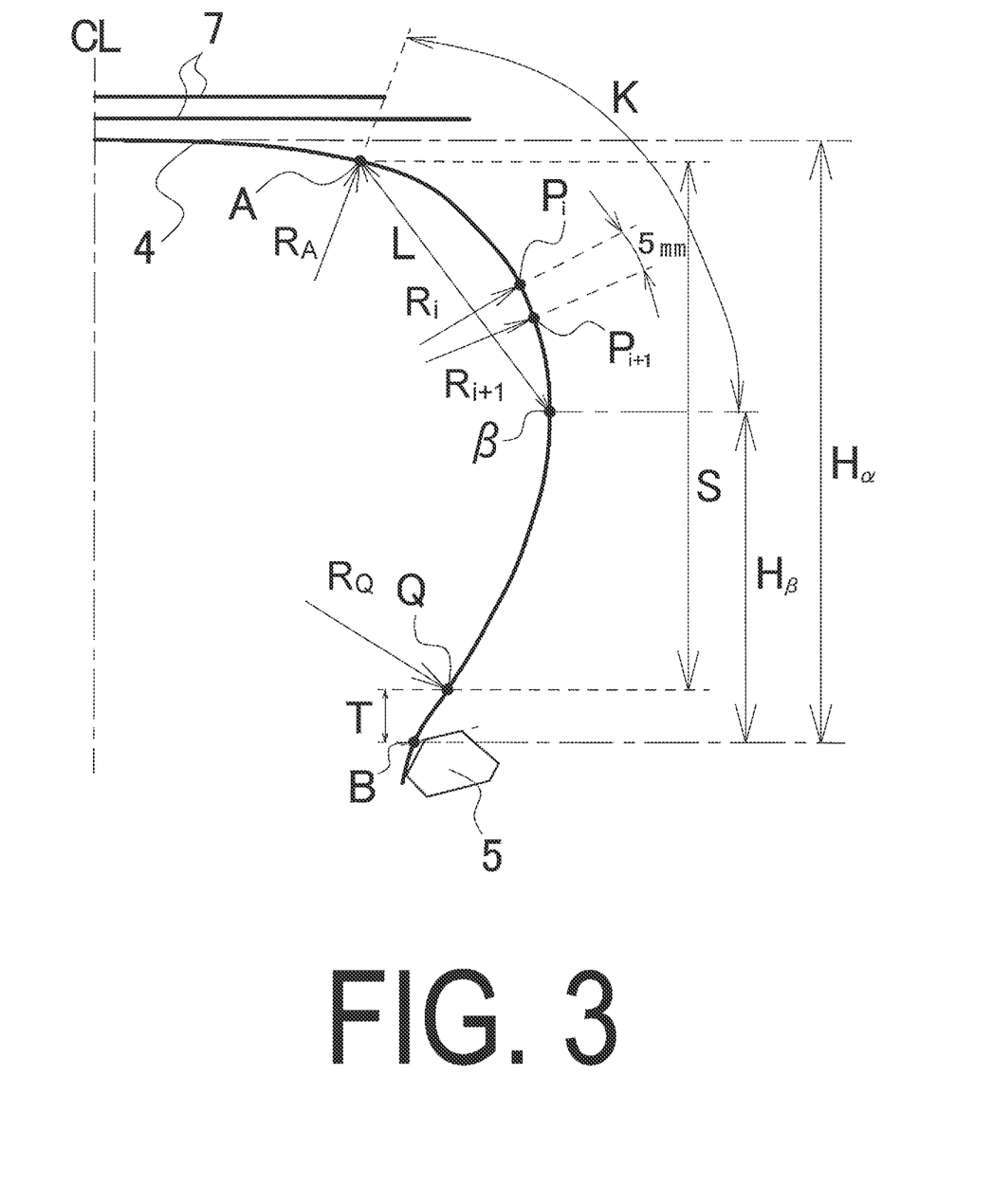
FIG. 3 is an explanatory diagram schematically illustrating the shape of a carcass line of the pneumatic tire according to an embodiment of the present technology.

In the present technology, as illustrated in FIG. 3, the carcass line formed by the carcass layer 4 in the region excluding the tread portion 1 when 10% of the regular internal pressure is applied is composed of a curved line S located on the tread portion 1 side and a curved line T located on the bead portion 3 side, and these curved lines S and T are connected at a point Q. In FIG. 3, a portion of the carcass layer 4, two belt layers 7, and the bead core 5 are extracted. In the carcass layer 4 of FIG. 3, the portion folded back to the outside of the bead core 5 is omitted. Strictly speaking, the region excluding the tread portion 1 is a region between an intersection point A between the carcass line and a normal line (the broken line in the drawing) of the carcass line passing through the belt end portion (the end portion of the belt layer 7 on the outer side in the tire width direction having the smallest width among the cross belt pair) and an intersection point (core separation point B) between the carcass line and an extension line (the broken line in the drawing) of the side of the bead core 5 on the outer side in the tire radial direction. That is, the curved line S is the portion from the intersection point A to the point Q in the carcass line formed by the carcass layer 4 when 10% of the regular internal pressure is applied, and the curved line T is the portion from the point Q to the core separation point B in the carcass line formed by the carcass layer 4 when 10% of the regular internal pressure is applied.

The curved line S defined as described above is configured by connecting a plurality of arcs having different radii of curvature, and is curved so as to project toward the outer side in the tire width direction as a whole. The curved line T defined as described above is curved so as to project toward the inner side in the tire width direction as a whole, and may be configured by connecting a plurality of arcs having different radii of curvature similarly to the curved line S. Since the curved line S and the curved line T have opposite curving directions (projecting directions), it can be said that the point Q is a point where the curving direction is reversed between the curved line S and the curved line T.

In the present technology, for the curved line S, the radius of curvature of the curved line S at an arbitrary point $P_i$ on the curved line S is $R_i$. Further, a point separated from this point $P_i$ toward the bead portion 3 side by $(5 \times n)$ mm along the carcass line is defined as $P_{i+n}$, and the radius of curvature of the curved line S at $P_{i+n}$ is defined as $R_{i+n}$ (n is an integer of 1 or more). In other words, when points are marked at intervals of 5 mm along the carcass line toward the point Q side (bead portion 3 side) using an arbitrary point $P_i$ on the curved line S as a reference, the n-th point from the point $P_i$ (n is an integer of 1 or more) is defined as $P_{i+n}$, and the radius of curvature of the curved line S at that point $P_{i+n}$ is defined as $R_{i+n}$. For example, when n=2, that is, a point separated from the point $P_i$ toward the point Q side (the bead portion 3 side) along the carcass line by 5×2=10 mm (the second point of the points at intervals of 5 mm from the point $P_i$) is a point $P_{i+2}$, and the radius of curvature of the curved line S at this point $P_{i+2}$ is $R_{i+2}$.

In the present technology, in particular, the point $P_{i+n}$ when n=1 is referred to as an adjacent point $P_{i+1}$. The adjacent point $P_{i+1}$ is a point separated by 5 mm (5×1 mm) from the point $P_i$ toward the bead portion 3 side along the carcass line (the first point of the points at intervals of 5 mm from the point $P_i$), and the radius of curvature of the curved line S at the point $P_{i+1}$ is $R_{i+1}$. At this time, in the present technology, the radius of curvature $R_i$ at an arbitrary point $P_i$ and the radius of curvature $R_{i+1}$ at the adjacent point $P_{i+1}$ satisfy the relationship of $|R_{i+1}-R_i|/|(R_{i+1}+R_i)/2| \leq 0.25$. By setting the radius of curvature in this way, on the curved line S, the curvatures of the plurality of arcs constituting the carcass line change substantially continuously and smoothly, and a substantially equilibrium carcass line can be constructed. Therefore, the deformation due to the change in the internal pressure can be suppressed, and the localized deformation in the vicinity of the bead portion 3 particularly can be suppressed, so that the rolling resistance can be reduced. At this time, if the radius of curvature $R_i$ and the radius of curvature $R_{1+i}$ have the relationship of $|R_{i+1}-R_i|/|(R_{i+1}+R_i)/2|>0.25$, the arc forming the curved line S at the position of the point $P_i$ and the arc forming the curved line S at the position of the adjacent point $P_{i+1}$ are not smoothly connected, the deviation from the equilibrium carcass line becomes large, and the effect of suppressing the deformation due to the change in internal pressure is not sufficiently expected.

Figure 4:
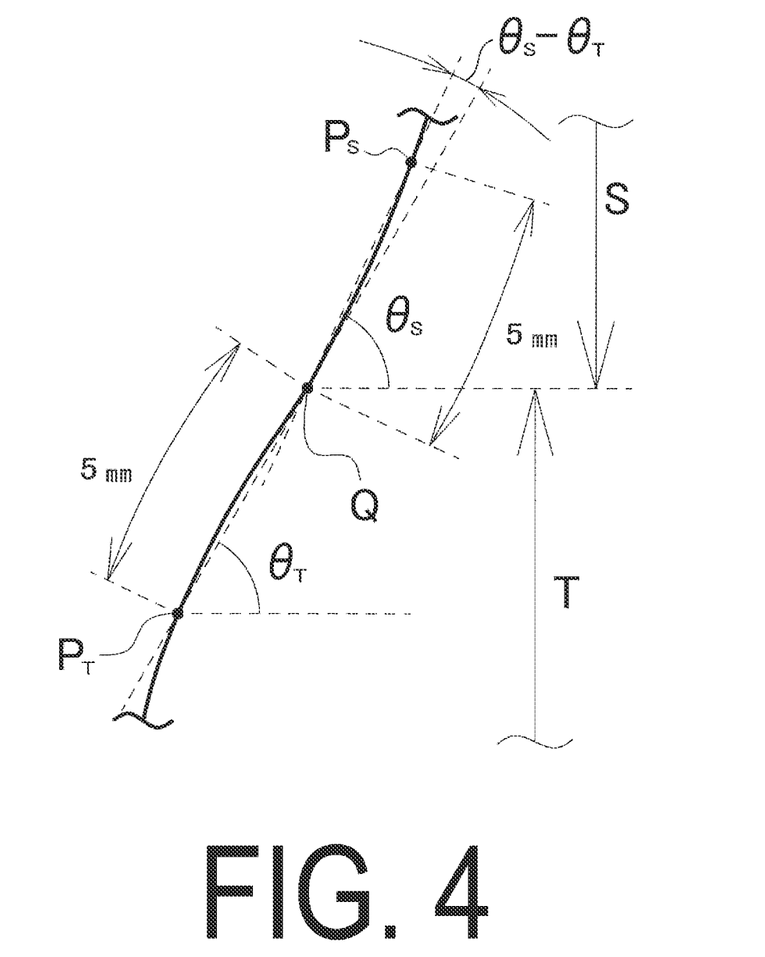
FIG. 4 is an enlarged explanatory view illustrating the vicinity of the point Q in FIG. 3.

As described above, the curved line S and the curved line T are connected via the point Q. At this time, as illustrated in FIG. 4 on an enlarged scale, a point separated by 5 mm from the point Q toward the point A side (the tread portion 1 side) along the curved line S is defined as $P_S$, and the inclination (the angle with respect to the tire width direction) of a line segment connecting this point $P_S$ and the point Q is defined as $\theta_S$. Similarly, a point separated by 5 mm from the point Q toward the point B side (the bead portion 3 side) along the curved line T is defined as a $P_T$, and the inclination (the angle with respect to the tire width direction) of the line segment connecting this point $P_T$ and the point Q is defined as $\theta_T$. At this time, the absolute value $|\theta_S-\theta_T|$ of the difference between the inclinations $\theta_S$ and $\theta_T$ may satisfy the relationship of $|\theta_S-\theta_T|\le 8°$, preferably $|\theta_S-\theta_T|\le 5°$. By defining the structure near the point Q in this way, the curved line S and the curved line T whose projecting directions are opposite to each other are smoothly connected. That is, even if the curved line S forms an equilibrium carcass line, the curved line S can be smoothly connected to the curved line T which projects toward the inner side in the tire width direction. As a result, localized deformation in the vicinity of the bead portion 3 can be suppressed, and heat generation in the bead portion 3 can be suppressed, so that rolling resistance can be reduced. At this time, if the absolute value $|\theta_S-\theta_T|$ of the difference between the inclinations $\theta_S$ and $\theta_T$ exceeds 8°, the curved line S and the curved line T are not smoothly connected and become discontinuous, so that a large localized deformation in the vicinity of the point Q is likely to occur, and the effect of reducing rolling resistance cannot be expected.

Furthermore, when the distance along the tire radial direction from the position of the core separation point B to the maximum outer diameter position of the carcass layer 4 using the position of the inner end in the tire radial direction of the curved line T (that is, the core separation point B) as a reference is defined as a radial height $H\alpha$, and the distance along the tire radial direction from the position of the core separation point B to the tire maximum width position is defined as a radial height $H\beta$, in the present technology, the ratio $H\beta/H\alpha$ of these radial heights satisfies the relationship of $H\beta/H\alpha\ge 0.58$. By satisfying such a relationship, the tire maximum width position tends to be close to the outer side in the tire radial direction, and becomes easy to be smoothly connected to the curved line T curved so as to project toward the inner side in the tire width direction, and it becomes easy to achieve an equilibrium carcass line. Further, since the tire maximum width position is close to the outer side in the tire radial direction, the curved shape of the carcass layer 4 from the vicinity of the end portion of the belt layer 7 to the tire maximum width position is improved, thereby making it possible to suppress the thickness of the buttress portion, it is also possible to effectively reduce rolling resistance. At this time, if the ratio H/Ha has a relationship of $H\beta/H\alpha<0.58$, the tire maximum width position tends to be close to the inner side in the tire radial direction, and it is difficult to smoothly connect the curved line S and the curved line T. Therefore, a good carcass line cannot be obtained, and the effect of reducing rolling resistance is not sufficiently expected. Further, since the thickness of the buttress portion cannot be suppressed, the rolling resistance cannot be sufficiently reduced from this point as well.

In the present technology, since the carcass line is formed by combining the above conditions ($|R_{i+1}-R_i|/|(R_{i+1}+R_i)/2|\le 0.25$, $|\theta_S-\theta_T|\le 8°$, $H\beta/H\alpha\ge 0.58$), it is possible to obtain a good curved shape smoothly connected to the curved line T curved so as to project toward the inner side in the tire width direction while approximating to an equilibrium carcass line in the portion that does not contact the belt layer 7, the bead filler 6, or the bead core 5 (the curved line S) on the basis of the curved shape and the connection shape of each portion obtained by the collaboration thereof. In this way, it is possible to suppress the occurrence of unnecessary deformation even if there is a change in the internal pressure, and it is possible to suppress localized deformation in the vicinity of the bead portion 3, so that rolling resistance can be reduced.

In the present technology, it is assumed that the radius of curvature is calculated on the basis of the following formula.

$$R_i = \{1+(dy/dz)^2\}^{3/2}/2/(d^2y/dz^2)$$

(In the above equation, dz is a distance between adjacent points in the tire radial direction (distance between the point $P_i$ and the point $P_{i+1}$), and dy is a distance between adjacent points in the tire width direction (distance between the point $P_i$ and the point $P_{i+1}$.)

In an actual tire, the shape and the radius of curvature of the carcass line are determined by discretizing a plurality of pieces of point cloud data constituting the carcass line on the basis of the cross-sectional shape taken by a CT (computed tomography) scan or the like. For example, a regression curve can be created using a plurality of pieces of point cloud data constituting the carcass line in a region included in a circle having a radius of 10 mm around the point $P_i$ on the carcass line. At this time, the regression curve may be created by any of a method of regression by a cubic expression, a method of regression by a least squares method, and a method of approximating to an arc passing through three points. The adjacent point $P_{i+1}$ can be determined as an intersection point of the regression curve created in this way and a circle having a radius of 5 mm around the point $P_i$. The distinguishing between the curved line S and the curved line T (determination of the orientations in which the curved lines S and T project) can be determined by the sign of the radius of curvature of the carcass line obtained as described above. The point Q can also be determined as a point connecting the curved lines S and T determined by the sign of the radius of curvature of the carcass line.

In setting the carcass line as described above, it is preferable that the radius of curvature $R_i$ and the radius of curvature $R_{i+2}$ satisfy the relationship of $R_{i+2}/R_i\ge 1.0$, and the radius of curvature $R_A$ of the curved line S at the intersection point A and the radius of curvature $R_Q$ of the curved line S at the point Q satisfy the relationship of $R_Q>R_A$. By setting the radius of curvature in this way, the curvatures of the plurality of arcs of the curved line S, forming the carcass line, change substantially continuously and smoothly, and the radius of curvature increases as it advances from the point A toward the inner side in the tire radial direction (the point Q side). In this way, the curved line S, which is substantially an equilibrium carcass line, can be smoothly connected to the curved line T. As a result, it is possible to suppress the occurrence of unnecessary deformation even if there is a change in internal pressure, and it is possible to suppress localized deformation in the vicinity of the bead portion 3, which is advantageous in reducing rolling resistance. At this time, if the radius of curvature $R_i$ and the radius of curvature $R_{i+2}$ have a relationship of $R_{i+2}/R_i<1.0$, the deviation from the equilibrium carcass line becomes large, and the deformation due to the change in internal pressure cannot be sufficiently suppressed. If the radius of curvature $R_A$ and the radius of curvature $R_Q$ have a relationship of $R_Q\le R_A$, the curved line S cannot be smoothly connected to the curved line T, so that the effect of suppressing localized deformation in the vicinity of the bead portion 3 is limited.

The radius of curvature $R_Q$ of the curved line S at the point Q and the radius of curvature $R_A$ of the curved line S at the intersection point A satisfy the above-mentioned relationship ($R_Q > R_A$), and preferably, the ratio $R_Q/R_A$ satisfies the relationship of $R_Q/R_A \geq 2.3$. By setting such a relationship, the radius of curvature $R_Q$ of the curved line S at the point Q can be made sufficiently larger than the radius of curvature $R_A$ of the curved line S at the intersection point A, and the shape of the carcass line (curved line S) is improved. Therefore, even if there is a change in the internal pressure, it is possible to suppress the occurrence of unnecessary deformation. In particular, since the position of the point Q can be set close to the inner side in the tire width direction so that smooth connection of the curved line S to the curved line T can be easily achieved, it is advantageous in suppressing the localized deformation in the vicinity of the bead portion 3 and reducing the rolling resistance. At this time, if the ratio $R_Q/R_A$ is less than 2.3, the shape of the carcass line (curved line S) cannot be optimized, and the effect of reducing the rolling resistance is limited.

If only the radial height ratio Hβ/Hα is set to Hβ/Hα≥0.58 as described above, the ratio of the belt layer 7 sharing the internal pressure may increase, and the ground contact length may increase, which may have an adverse effect on rolling resistance. Therefore, when the point on the carcass line at the tire maximum width position (the point on the curved line S whose radial height from the core separation point B is Hβ) is defined as the point β, it is preferable that the length L of a line segment connecting the above-mentioned intersection point A and the point β and the length K along the carcass line (curved line S) from the point A to the point β satisfy a relationship of $(K/L)^3 < 1.25$. With such a structure, the curved shape of the carcass layer 4 from the vicinity of the end portion of the belt layer 7 to the tire maximum width position is improved, and an increase in the ground contact length (particularly, the ground contact length in the vicinity of the main groove) is suppressed. Moreover, it is possible to suppress the eccentricity of the peak position of the ground contact pressure distribution due to the viscoelastic characteristics and further reduce the rolling resistance. At this time, if the lengths K and L have the relationship of $(K/L)^3 \geq 1.25$, the curved shape of the carcass line is not improved, and further reduction of rolling resistance cannot be expected.

The curved line T is a region that is inevitably curved so as to project toward the inner side in the tire width direction due to the constituent members (the bead core 5, the bead filler 6, and the like) disposed in the bead portion 3 and deviates from the equilibrium carcass line. That is, if it is intended to approximate the entire carcass line to the equilibrium carcass line, it is preferable that the portion formed by the curved line T is small. Therefore, it is preferable that the periphery length U of the curved line T satisfies the relationship of U≤30 mm. In this way, the curved line T (the portion of the carcass line that is curved so as to project toward the inner side in the tire width direction) can be reduced, so that it is advantageous in suppressing the localized deformation in the vicinity of the bead portion 3 and reducing the rolling resistance. At this time, if the periphery length U of the curved line T exceeds 30 mm, there are many regions that project toward the inner side in the tire width direction and deviate from the equilibrium carcass line, and the effect of suppressing the localized deformation in the vicinity of the bead portion 3 is limited.

The bead core 5 preferably has a polygonal cross-sectional shape as described above, and particularly preferably a hexagonal cross-sectional shape as illustrated in FIG. 2. When the bead core 5 having a hexagonal cross-sectional shape is provided in this way, the vertex located closest to the tire radial inner side among the six vertices of the bead core 5 is set as a first vertex V1, and the remaining vertices are set as second to sixth vertices V2 to V6 counterclockwise from the first vertex. The positions of the second to sixth vertices V2 to V6 are determined by the arrangement state of the circumferential portions of the bead wires 5A constituting the bead core 5 in the tire width direction and the layered state in the tire radial direction. As illustrated in the drawings, the second vertex V2 may be located on the tire radial inner side next to the first vertex, the third vertex V3 may be located on the outermost side in the tire width direction, the fourth vertex V4 may be located on the tire radial outermost side, the fifth vertex V5 may be located on the tire radial outer side next to the fourth vertex, and the sixth vertex V6 is located on the innermost side in the tire width direction.

In the bead core 5 having a hexagonal cross-sectional shape, when the number of circumferential portions of the bead wire 5A included in the side L z formed by the first vertex V1 and the second vertex V2 is $N_{12}$, the number of circumferential portions of the bead wire 5A included in the side $L_{23}$ formed by the second vertex V2 and the third vertex V3 is $N_{23}$, the number of circumferential portions of the bead wire 5A included in the side $L_{34}$ formed by the third vertex V3 and the fourth vertex V4 is $N_{34}$, the number of circumferential portions of the bead wire 5A included in the side $L_{45}$ formed by the fourth vertex V4 and the fifth vertex V5 is $N_{45}$, the number of circumferential portions of the bead wire 5A included in the side $L_{56}$ formed by the fifth vertex V5 and the sixth vertex V6 is $N_{56}$, and the number of circumferential portions of the bead wire 5A included in the side $L_{61}$ formed by the sixth vertex V6 and the first vertex V1 is $N_{61}$, it is preferable that these numbers satisfy the relationship of $4 \leq (N_{12}-N_{45})+(N_{34}-N_{61})+(N_{56}-N_{23}) \leq 10$. For example, in the illustrated example, since N 12 is 6, $N_{23}$ is 3, $N_{34}$ is 6, $N_{45}$ is 4, $N_{56}$ is 5, and $N_{61}$ is 4, the relationship of $(N_{12}-N_{45})+(N_{34}-N_{61})+(N_{56}-N_{23})=(6-4)+(6-4)+(5-3)=6$ is satisfied. With such a structure, the center-of-gravity position of the bead core 5 can be moved closer to the bead toe side, and the floating deformation of the bead toe can be suppressed. As a result, it is possible to suppress localized deformation in the vicinity of the bead portion 3 not only by the shape of the carcass layer 4 (carcass line) but also by the shape of the bead core 5. That is, it is possible to suppress heat generation in the bead portion 3 and further reduce the rolling resistance. At this time, if the above-mentioned relationship of the numbers is not satisfied, the center-of-gravity position of the bead core 5 cannot be moved closer to the bead toe side, the localized deformation in the vicinity of the bead portion 3 cannot be sufficiently suppressed, and further reduction of the rolling resistance cannot be expected.

Examples

Thirteen pneumatic tires of Conventional Example 1, Comparative Examples 1 to 3, and Examples 1 to 9 were manufactured in which the tires have the size of 275/70R22.5 and have the basic structure illustrated in FIG. 1, and for the carcass line (the curved lines S and T) formed by the carcass layer in the region excluding the tread portion when 10% of the regular internal pressure is applied, the radius of curvature $R_A$ of the curved line S at the intersection point A between the carcass line and the normal line of the carcass line passing through the belt end portion (the end portion on the outer side in the tire width direction of the belt layer having the smallest width among the cross belt pair), the radius of curvature $R_Q$ of the curved line S at the point Q connecting the curved lines S and T, the inclination $\theta_S$ of the line segment connecting the point Q and the adjacent point $P_S$ separated by 5 mm along the curved line S from the point Q toward the tread portion, the inclination $\theta_T$ of the line segment connecting the point Q and the adjacent point $P_T$ separated by 5 mm along the curved line T from the point Q toward the bead portion, the periphery length U of the curved line T, the radius of curvature $R_i$ of the curved line S at an arbitrary point $P_i$ on the curved line S, whether the radius of curvature $R_{i+1}$ of the curved line S at the adjacent point $P_{i+1}$ separated by 5 mm along the carcass line from the point $P_i$ toward the bead portion satisfies the relationship of $|R_{i+1}-R_i|/|(R_{i+1}+R_i)/2| \leq 0.25$, the ratio $H\beta/H\alpha$ between the radial height $H\alpha$ from the position of the core separation point B to the outermost position in the tire radial direction of the carcass layer 4 and the radial height $H\beta$ to the tire maximum width position, the absolute value $|\theta_S-\theta_T|$ of the difference between the inclination $\theta_S$ and the inclination $\theta_T$, the ratio $(K/L)^3$ between the length L of the line segment connecting the intersection point A and the point β on the carcass line at the tire maximum width position and the length K along the carcass line (the curved line S) from the point A to the point β, the ratio $R_Q/R_A$ between the radius of curvature $R_Q$ and the radius of curvature $R_A$, whether the periphery length U is less than 30 mm, the value of $(N_{12}-N_{45})+(N_{34}-N_{61})+(N_{56}-N_{23})$ calculated from the number $N_{12}$ of the circumferential portions of the bead wire included in the side formed by the first vertex and the second vertex of the bead core, the number $N_{23}$ of the circumferential portions of the bead wire included in the side formed by the second vertex and the third vertex of the bead core, the number $N_{34}$ of the circumferential portions of the bead wire included in the side formed by the third vertex and the fourth vertex of the bead core, the number $N_{45}$ of the circumferential portions of the bead wire included in the side formed by the fourth vertex and the fifth vertex of the bead core, the number $N_{56}$ of the circumferential portions of the bead wire included in the side formed by the fifth vertex and the sixth vertex of the bead core, and the number $N_{61}$ of the circumferential portions of the bead wire included in the side formed by the sixth vertex and the first vertex of the bead core are set as shown in Table 1.

In Table 1, in the columns of "$|R_{i+1}-R_i|/|(R_{i+1}+R_i)/2| \leq 0.25$" and "U<30 mm", "good" is displayed when the relationship of each item is satisfied, and "poor" is displayed when the relationship is not satisfied.

The low rolling performance of these pneumatic tires was evaluated by the following evaluation method, and the results are also shown in Table 1.

Low Rolling Performance

The test tires were mounted on a rim specified by JATMA and the rolling resistance was measured in accordance with ISO (International Organization for Standardization) 28580 using a steel drum rolling resistance tester under the conditions of the specified air pressure, 0.85 times the specified load, and a speed of 60 km/h. The evaluation results are expressed as indices using the reciprocal of the measurement values, with the Conventional Example 1 being assigned the value of 100. Larger index values indicate lower rolling resistance and excellent low rolling performance. When the index value was "150" or less, the rolling resistance reduction effect was small, and the significant effect of improving the low rolling performance was not obtained.

TABLE 1-1

|  | Conventional Example 1 | Example 1 | Example 2 | Example 3 |
|---|---|---|---|---|
| $R_A$ mm | 39 | 38 | 38 | 38 |
| $R_Q$ mm | 67 | 212 | 199 | 185 |
| $\theta_S$ ° | 50.2 | 54.3 | 53.6 | 52.9 |
| $\theta_T$ ° | 42.0 | 49.5 | 47.5 | 46.5 |
| U mm | 42 | 26 | 28 | 30 |
| $|R_{i+1} - R_i|/|(R_{i+1} + R_i)/2| \leq 0.25$ | Good | Good | Good | Good |
| $H\beta/H\alpha$ | 0.583 | 0.604 | 0.609 | 0.616 |
| $|\theta_S - \theta_T|$ ° | 8.2 | 4.8 | 6.1 | 6.4 |
| $(K/L)^3$ | 1.28 | 1.19 | 1.21 | 1.22 |
| $R_Q/R_A$ | 1.70 | 5.52 | 5.22 | 4.89 |
| U < 30 mm | Poor | Good | Good | Good |
| $(N_{12} - N_{45}) + (N_{34} - N_{61}) + (N_{56} - N_{23})$ | 0 | 6 | 6 | 6 |
| Low rolling performance Index | 100 | 176 | 170 | 173 |

TABLE 1-2

|  | Example 4 | Example 5 | Example 6 | Example 7 | Example 8 |
|---|---|---|---|---|---|
| $R_A$ mm | 38 | 38 | 40 | 42 | 43 |
| $R_Q$ mm | 178 | 175 | 128 | 93 | 75 |
| $\theta_S$ ° | 52.1 | 50.9 | 50.3 | 48.2 | 45.2 |
| $\theta_T$ ° | 45.5 | 44.5 | 48.5 | 45.5 | 44.5 |
| U mm | 31 | 32 | 27 | 31 | 32 |
| $|R_{i+1} - R_i|/|(R_{i+1} + R_i)/2| \leq 0.25$ | Good | Good | Good | Good | Good |
| $H\beta/H\alpha$ | 0.621 | 0.626 | 0.596 | 0.589 | 0.583 |
| $|\theta_S - \theta_T|$ ° | 6.6 | 6.4 | 1.8 | 2.7 | 0.7 |
| $(K/L)^3$ | 1.24 | 1.26 | 1.19 | 1.20 | 1.20 |
| $R_Q/R_A$ | 4.72 | 4.65 | 3.21 | 2.24 | 1.75 |
| U < 30 mm | Poor | Poor | Good | Poor | Poor |
| $(N_{12} - N_{45}) + (N_{34} - N_{61}) + (N_{56} - N_{23})$ | 6 | 6 | 6 | 6 | 6 |
| Low rolling performance Index | 171 | 169 | 169 | 150 | 151 |

TABLE 1-3

|  | Comparative Example 1 | Comparative Example 2 | Comparative Example 3 | Example 9 |
|---|---|---|---|---|
| $R_A$ mm | 44 | 46 | 45 | 38 |
| $R_Q$ mm | 64 | 56 | 500 | 212 |
| $\theta_S$ ° | 44.3 | 43.2 | 65.0 | 54.3 |
| $\theta_T$ ° | 41.5 | 39.5 | 68.0 | 49.5 |
| U mm | 35 | 37 | 50 | 26 |
| $|R_{i+1} - R_i|/|(R_{i+1} + R_i)/2| \leq 0.25$ | Good | Good | Poor | Good |
| $H\beta/H\alpha$ | 0.577 | 0.571 | 0.620 | 0.604 |
| $|\theta_S - \theta_T|$ ° | 2.8 | 3.7 | 3.0 | 4.8 |
| $(K/L)^3$ | 1.20 | 1.20 | 1.50 | 1.19 |
| Rq/Ra | 1.44 | 1.23 | 11.11 | 5.52 |
| U < 30 mm | Poor | Poor | Poor | Good |
| $(N_{12} - N_{45}) + (N_{34} - N_{61}) + (N_{56} - N_{23})$ | 6 | 6 | 6 | 0 |
| Low rolling performance Index | 128 | 116 | 110 | 172 |

As can be seen from Table 1, all of Examples 1 to 9 improved the low rolling performance. On the other hand, in Comparative Examples 1 and 2, the rolling resistance could not be sufficiently reduced because the ratio Hβ/Hα was small. In Comparative Example 3, since the radius of curvature of the curve S does not satisfy the relationship of $|R_{i+1}-R_i|/|(R_{i+1}+R_i)/2|\leq 0.25$, the rolling resistance could not be sufficiently reduced.

The invention claimed is:

1. A pneumatic tire comprising:
a tread portion extending in a tire circumferential direction and having an annular shape;
a pair of sidewall portions respectively disposed on both sides of the tread portion;
a pair of bead portions each disposed on an inner side in a tire radial direction of the pair of sidewall portions;
at least one carcass layer mounted between the pair of bead portions; and
a plurality of belt layers disposed on an outer circumferential side of the at least one carcass layer in the tread portion,
in a tire meridian cross-section, a carcass line formed by the at least one carcass layer in a region excluding the tread portion when 10% of a regular internal pressure is applied, the carcass line being composed of a curved line S located on a tread portion side and a curved line T located on the bead portion side, the curved line S being formed by connecting a plurality of arcs having different radii of curvature and curved so as to project toward an outer side in a tire width direction as a whole, and the curved line T being curved so as to project toward an inner side in the tire width direction,
a radius of curvature $R_i$ of the curved line S at an arbitrary point $P_i$ on the curved line S and a radius of curvature $R_{i+1}$ of the curved line S at an adjacent point $P_{i+1}$ separated by 5 mm from the point $P_i$ toward the bead portion side along the carcass line satisfying a relationship of $|R_{i+1}-R_i|/|(R_{i+1}+R_i)/2|\leq 0.25$,
at a point Q where the curved line S and the curved line T are connected, an absolute value $|\theta_S-\theta_T|$ of a difference between an inclination $\theta_S$ of a line segment connecting the point Q and an adjacent point $P_S$ separated by 5 mm from the point Q toward the tread portion side along the curved line S and an inclination $\theta_T$ of a line segment connecting the point Q and an adjacent point $P_T$ separated by 5 mm from the point Q toward the bead portion side along the curved line T satisfying a relationship of $|\theta_S-\theta_T|\leq 8°$, and
a ratio Hβ/Hα of a radial height Hα from an inner end in the tire radial direction of the curved line T to a maximum outer diameter position of the at least one carcass layer and a radial height Hβ from the inner end in the tire radial direction of the curved line T to a tire maximum width position satisfying a relationship of Hβ/Hα≥0.58.

2. The pneumatic tire according to claim 1, wherein
when an intersection point of the carcass line and a normal line of the carcass line passing through a belt end portion is a point A and a point on the carcass line at the tire maximum width position is a point β,
a length L of a line segment connecting the point A and the point β and a length K along the carcass line from the point A to the point β satisfy a relationship of $(K/L)^3<1.25$.

3. The pneumatic tire according to claim 1, wherein a ratio $R_Q/R_A$ of a radius of curvature $R_Q$ of the curved line S at the point Q where the curved line S and the curved line T are connected and a radius of curvature $R_A$ of the curved line S at an intersection point A of the carcass line and a normal line of the carcass line passing through a belt end portion satisfies a relationship of $R_Q/R_A\geq 2.3$.

4. The pneumatic tire according to claim 1, wherein a periphery length U of the curved line T satisfies a relationship of U≤30 mm.

5. The pneumatic tire according to claim 1, wherein
a bead portion of the pair of bead portions is provided with a bead core having a hexagonal meridional cross-sectional shape, and
when a vertex on a radially innermost side among six vertices of the bead core is defined as a first vertex, remaining vertices are defined as second to sixth vertices counterclockwise from the first vertex, the number of circumferential portions of a bead wire included in a side formed by the first vertex and the second vertex is $N_{12}$, the number of circumferential portions of the bead wire included in a side formed by the second vertex and the third vertex is $N_{23}$, the number of circumferential portions of the bead wire included in a side formed by the third vertex and the fourth vertex is $N_{34}$, the number of circumferential portions of the bead wire included in a side formed by the fourth vertex and the fifth vertex is $N_{45}$, the number of circumferential portions of the bead wire included in a side formed by the fifth vertex and the sixth vertex is $N_{56}$, and the number of circumferential portions of the bead wire included in a side formed by the sixth vertex and the first vertex is $N_{61}$, these numbers satisfy a relationship of $4\leq(N_{12}-N_{45})+(N_{34}-N_{61})+(N_{56}-N_{23})\leq 10$.

6. The pneumatic tire according to claim 2, wherein a ratio $R_Q/R_A$ of a radius of curvature $R_Q$ of the curved line S at the point Q where the curved line S and the curved line T are connected and a radius of curvature $R_A$ of the curved line S at an intersection point A of the carcass line and a normal line of the carcass line passing through a belt end portion satisfies a relationship of $R_Q/R_A\geq 2.3$.

7. The pneumatic tire according to claim 6, wherein a periphery length U of the curved line T satisfies a relationship of U≤30 mm.

8. The pneumatic tire according to claim 7, wherein
a bead portion of the pair of bead portions is provided with a bead core having a hexagonal meridional cross-sectional shape, and
when a vertex on a radially innermost side among six vertices of the bead core is defined as a first vertex, remaining vertices are defined as second to sixth vertices counterclockwise from the first vertex, the number of circumferential portions of a bead wire included in a side formed by the first vertex and the second vertex is $N_{12}$, the number of circumferential portions of the bead wire included in a side formed by the second vertex and the third vertex is $N_{23}$, the number of circumferential portions of the bead wire included in a side formed by the third vertex and the fourth vertex is $N_{34}$, the number of circumferential portions of the bead wire included in a side formed by the fourth vertex and the fifth vertex is $N_{45}$, the number of circumferential portions of the bead wire included in a side formed by the fifth vertex and the sixth vertex is $N_{56}$, and the number of circumferential portions of the bead wire included in a side formed by the sixth vertex and the first vertex is $N_{61}$, these numbers satisfy a relationship of $4\leq(N_{12}-N_{45})+(N_{34}-N_{61})+(N_{56}-N_{23})\leq 10$.

* * * * *